United States Patent [19]

Lovrenich

[11] Patent Number: 5,619,722
[45] Date of Patent: Apr. 8, 1997

[54] ADDRESSABLE COMMUNICATION PORT EXPANDER

[75] Inventor: Rodger T. Lovrenich, Santa Teresa, N.M.

[73] Assignee: Teramar Group, Inc., El Paso, Tex.

[21] Appl. No.: 183,223

[22] Filed: Jan. 18, 1994

[51] Int. Cl.⁶ .................................................. G06F 13/00
[52] U.S. Cl. .......................... 395/822; 395/281; 395/500; 364/241.9; 364/238
[58] Field of Search .................. 340/825.02, 825.03, 340/825.52; 364/137, 138, 140; 370/13, 15, 56, 112; 379/5; 395/275, 325, 725, 800, 821, 822, 281–283, 500

[56] References Cited

U.S. PATENT DOCUMENTS

| | | | |
|---|---|---|---|
| 3,597,743 | 8/1971 | Murphy | 364/221.9 |
| 3,648,252 | 3/1972 | Thron et al. | 395/650 |
| 3,902,162 | 8/1975 | Parkinson | 395/871 |
| 4,254,473 | 3/1981 | Galdun et al. | 395/822 |
| 4,264,954 | 4/1981 | Briggs et al. | 395/824 |
| 4,443,884 | 4/1984 | Swarz | 375/121 |
| 4,472,788 | 9/1984 | Yamazaki | 364/715.01 |
| 4,504,927 | 3/1985 | Callan | 395/822 |
| 4,607,170 | 8/1986 | Wickman | 307/147 |
| 4,658,375 | 4/1987 | Onogi et al. | 395/822 |
| 4,736,394 | 4/1988 | Giovannelli et al. | 375/121 |
| 4,794,520 | 12/1988 | Kobus, Jr. et al. | 395/287 |
| 4,794,525 | 12/1988 | Pickert et al. | 395/750 |
| 5,014,193 | 5/1991 | Garner et al. | 395/830 |
| 5,045,675 | 9/1991 | Curry | 235/441 |
| 5,051,980 | 9/1991 | Olsen | 370/32.1 |
| 5,060,134 | 10/1991 | Hunninghaus | 395/250 |
| 5,062,076 | 10/1991 | Ho et al. | 395/841 |
| 5,134,691 | 7/1992 | Elms | 395/200.01 |
| 5,175,819 | 12/1992 | Le Ngoc et al. | 395/250 |
| 5,175,820 | 12/1992 | Gephardt | 395/834 |
| 5,191,655 | 3/1993 | Sarkissian | 395/824 |
| 5,223,833 | 6/1993 | Akata | 341/100 |
| 5,239,629 | 8/1993 | Miller et al. | 395/311 |
| 5,243,700 | 9/1993 | Larsen et al. | 395/822 |
| 5,261,057 | 11/1993 | Coyle et al. | 395/308 |
| 5,263,141 | 11/1993 | Sawani | 395/800 |
| 5,280,586 | 1/1994 | Kunz et al. | 395/822 |
| B1 4,366,479 | 3/1992 | Mori et al. | 340/825.05 |

*Primary Examiner*—Lance L. Barry
*Attorney, Agent, or Firm*—Brooks & Kushman P.C.

[57] ABSTRACT

A computer interface comprising a demultiplexer, multiplexer, and shift register for providing a data communication path between an input port and a selected one of a plurality of output ports. The data communication path is provided in response to an address signal received at the input port. A secondary address signal, derived from a previous address signal, is provided to each of the plurality of output ports. The resulting interface is hermaphroditic in that a first interface can address and communicate with a second interface coupled thereto. A tree-like cascading of one or more like interfaces produces a system for interfacing a computer with a plurality of remote peripheral devices. Embodiments of the present invention for both serial input and output ports and parallel input and output ports are presented.

28 Claims, 12 Drawing Sheets

ADDRESSABLE COMMUNICATION PORT EXPANDER

TECHNICAL FIELD

This invention generally relates to computer data communications, and more particularly, to communication between a computer and a plurality of peripheral devices.

BACKGROUND ART

Transmission of digital data using serial communications is a long established practice in the art of data communication. With the advent of the digital computer, and specifically personal computers, the use of serial communications has become commonplace. Personal computers use serial communication to drive peripheral devices, such as printers, plotters, modems, and page scanners, via serial output ports located on each computer. The RS-232 standard, defined by specification EIA-232-D, is the predominant standard by which serial communication is performed using a personal computer. Hence, many personal computers contain at least one RS-232 serial port, wired in a data terminal equipment (DTE) configuration, for communication with peripheral devices containing an RS-232 serial port wired in a data circuit-terminating equipment (DCE) configuration. A difference between the DTE and DCE configurations is a result of reversing a data receive line (also known as an RD line or an RXD line) with a data transmit line (also known as a TD line or a TXD line).

In many industrial applications, the monitoring and recording of measurements made from electronic instrumentation devices are of interest. Such electronic instrumentation devices include digital voltmeters, ammeters, power meters, pressure meters, flow meters, and thermometers. To facilitate the use of computers to automatically monitor, record, and process measurements, many electronic instrumentation devices have incorporated RS-232 serial ports therein to enable data to be transferred to a computer.

Although the RS-232 protocol has been favorably employed for interfacing conventional peripheral devices to computers, its scope of application is limited by its inherent design for communication between a single sending device and a single receiving device, namely, a single computer and a single peripheral device. Therefore, an unaccompanied use of a single RS-232 port presents an obstacle in applications where a large number of peripheral devices are to be interfaced to the computer, such as a power plant or any general process control application wherein many instrumentation devices are to be monitored.

One method of interfacing a plurality of peripheral devices to a single RS-232 port on a computer is by wiring, in parallel, the RS-232 ports on the peripheral devices to the RS-232 port on the computer. Although parallel wiring does allow the same serial data to be sent to the plurality of peripheral devices, difficulties arise when the peripheral devices attempt to transmit data to the computer. Moreover, damage to either a peripheral device or the computer can result when two peripheral devices simultaneously attempt to impress different voltages on the same parallel-wired line.

An improved approach to handling data from multiple RS-232 devices is to employ one RS-232 computer port for each device. Many personal computers have software provision for four serial ports (COM1, COM2, COM3, and COM4), although only two of these ports have operating-system-specified software interrupts. Hence, when using an unmodified, off-the-shelf personal computer, this approach is currently limited to applications having no greater than four peripheral devices.

Another approach is to install a multi-port expansion board in an internal computer slot. In currently-available multi-port expansion boards, the number of serial ports can be extended up to eight. However, the multi-port board approach suffers in that the number of peripheral devices is limited to the number of output ports on the board. This limitation is significant in applications such as power plant monitoring, where the number of devices that need to be accessed can be more than a dozen, with 16 or 32 peripheral devices being common.

A more flexible method for communication between a single computer port and many remote peripheral devices is based on a serial communication standard defined by EIA specification RS-485. The RS-485 standard utilizes tri-state outputs on the sending units of each remote device, in other words, each device output is either high, low, or off. When the computer needs to exchange data with a specific device, the computer first sends an address for a selected peripheral device of interest on a transmit line of the computer. To be RS-485 compatible, each peripheral device must have inherent addressing circuitry so that it can recognize its own address code. Typically, the individual address code for each peripheral device is set by the positions of a number of DIP switches on the device. After the selected peripheral device has recognized that its address code was sent on the transmit line of the computer, the device activates its output and seizes a receive line of the computer. When the receive line of the computer is seized, other devices on the system must release the receive line of the computer by putting their respective device output in the off state to avoid incapacitating any messages sent from the addressed device. All devices that are not sending data to the computer must be in the off state so that there is no contention for the computer's receive line. A shortcoming of the RS-485 protocol is that if identical address codes are assigned to more than one remote device, the possibility exists of a system malfunction caused by two devices forcing two different voltage levels on the receive line of the computer. Moreover, many peripheral devices are not equipped to communicate using the RS-485 standard.

A method of providing parallel communications between a computer and a plurality of peripheral devices employs the IEEE-488 interface bus. IEEE-488 has been applied to a wide variety of conventional peripherals, such as disk drives, printers, and plotters, along with programmable instrumentation devices such as data recorders, oscilloscopes, and digital voltmeters. Hewlett-Packard has combined the IEEE-488 standard with a communication system that allows devices on the IEEE-488 bus to communicate with one another, the combination being known as HPIB. However, the HPIB interface is currently limited to no more than 15 devices being connected in parallel on an HPIB bus.

Another method of providing parallel communications between a computer and a plurality of peripheral devices employs a Small Computer Systems Interface (SCSI). SCSI was developed by the American National Standards Institute (ANSI) in response to a need for a sophisticated, high-speed parallel interface capable of serving multiple intelligent peripheral devices. A SCSI bus is designed to support up to eight devices (including the computer) with up to 2,048 addressable units per device. Data may be transferred using SCSI not only to and from the host computer, but between peripheral devices as well. A shortcoming of SCSI is in its general unavailability as an option for instrumentation devices. Further, the cost of providing the intelligence mandated by the SCSI protocol can be prohibitive for some applications.

SUMMARY OF THE INVENTION

For the foregoing reasons, there is a need for a computer interface that is capable of providing an unlimited number of addressable multiplexed output ports to interface with remote peripheral devices, wherein the remote peripheral devices need not have inherent addressing circuitry, and wherein the computer interface can be inexpensively manufactured.

It is thus an object of the present invention to increase the number of addressable multiplexed output ports in a computer interfacing system.

Another object of the present invention is to provide the multiplexed output ports to remote peripheral devices not having inherent addressing circuitry.

A further object is to provide a computer interfacing system which can be constructed using conventional integrated circuit components.

A still further object is to include presence detectability in a computer interface, wherein the presence can be detected by a computer using routine transmitted and received data signals.

In carrying out the above objects, the present invention provides a cascadable computer interface apparatus for providing a data communication path between an input port and a selected one of a plurality of output ports. The apparatus comprises a data selector circuit which provides the data communication path between the input port and the selected one of the plurality of output ports based upon a received signal indicating the selected one of the plurality of output ports. The apparatus further comprises a secondary signal generator responsive to the received signal, which provides a secondary signal to each of the plurality of output ports capable of driving a like cascadable computer interface apparatus, wherein the secondary signal is derived from a previous received signal.

In carrying out the above objects, the present invention further provides a computer interface apparatus for providing a data communication path between an input port and a selected one of a plurality of output ports, wherein the input port and each of the plurality of output ports is a RS-232 port having a data transmit line, a data receive line, a first control line, and a second control line. The apparatus comprises a shift register having a data input, a clock input, and a plurality of outputs. The data input is responsive to a first control signal received from the first control line of the input port, and the clock input is responsive to a second control signal received from the second control line, so that the plurality of outputs identifies the selected one of the plurality of output ports. The apparatus further comprises a multiplexer which responds to the plurality of outputs of the shift register to provide a first data transmission path between the data transmit line of the selected one of the plurality of output ports and the data receive line of the input port. The apparatus further comprises a demultiplexer with responds to the plurality of outputs of the shift register to provide a second data transmission path between the data transmit line of the input port and the data receive line of the selected one of the plurality of output ports. The first control line of each of the plurality of output ports is coupled to a selected one of plurality of output ports, and the second control line of each of the plurality of output ports is coupled to the second control line of the input port.

In carrying out the above objects, the present invention still further provides a system for providing a data communication path between a computer and a selected one of a plurality of peripheral devices. One or more cascadable interfaces, wherein each of the interfaces has an input port and a plurality of output ports, are coupled in a tree-like configuration such that each of the plurality of peripheral devices is coupled to the computer by a cascade of at least one of the one or more cascadable interfaces. Each of the interfaces is capable of providing a local data communication path between the input port and a selected one of the plurality of output ports based upon an address signal received at the input port. Each of the interfaces is further capable of providing a secondary address signal at each of the plurality of output ports capable of driving a like cascadable interface, wherein the secondary address signal is derived from a previous address signal received at the input port. The data communication path is provided in response to a global address signal generated by the computer, wherein the global address signal contains the address signal for each local data communication path forming the cascade of the at least one of the one or more interfaces coupling the selected one of the peripheral devices to the computer.

In carrying out the above objects, the present invention yet further provides a cascadable computer interface apparatus for providing a first data communication path between an input port and each of a plurality of output ports, and for providing a second data communication path between the input port and a selected one of the plurality of output ports. The first data communication path is provided by coupling means between the input port and each of the plurality of output ports. A data selector circuit provides the second data communication path between the input port and the selected one of the plurality of output ports based upon a received signal indicating the selected one of the plurality of output ports. A secondary signal generator provides a secondary signal, derived from a previous received signal, to each of the plurality of output ports capable of driving a like cascadable computer interface apparatus.

In carrying out the above objects, the present invention yet still further provides a computer interface apparatus for providing a first data communication path between an input port and each of a plurality of output ports, and for providing a second data communication path between the input port and a selected one of the plurality of output ports, wherein the input port and each of the plurality of output ports is a parallel communications port having at least one selectable data line, at least one fixed data line, a first control line, and a second control line. A bus provides the first data communication path by coupling in parallel the at least one fixed data line of the input port to the at least one fixed data line of each of the plurality of output ports. A plurality of outputs of a shift register having a data input responsive to a first control signal received from the first control line of the input port, and a clock input responsive to a second control signal received from the second control line, identifies the selected one of the plurality of output ports. At least one multiplexer provides at least one data transmission path from the at least one selectable data line of the selected one of the plurality of output ports to the at least one selectable data line of the input port, in response to the plurality of outputs of the shift register. The first control line of each of the plurality of output ports is coupled to a selected one of the plurality of outputs of the shift register, and the second control line of each of the plurality of output ports is coupled to the second control line of the input port.

In carrying out the above objects, the present invention further provides a computer interface apparatus. The apparatus comprises a serial input port, a plurality of serial output ports, and a data selector which provides a data communication path between the serial input port and a selected one of the plurality of serial output ports in response to a received signal indicating the selected one of the plurality of serial output ports.

In carrying out the above objects, the present invention still further provides a computer system. The computer system comprises a computer having a communication port, a plurality of peripheral devices each having a corresponding communication port, and one or more cascadable interfaces each having an input port and a plurality of output ports. The one or more cascadable interfaces are coupled in a tree-like configuration such that the corresponding communication port of each of the plurality of peripheral devices is coupled to the communication port of the computer by a cascade of at least one of the one or more cascadable interfaces. Each of the interfaces is capable of providing a local data communication path between the input port and a selected one of the plurality of output ports based upon an address signal received at the input port. Each of the interfaces is further capable of providing a secondary address signal at each of the plurality of output ports capable of driving a like cascadable interface, wherein the secondary address signal is derived from a previous address signal received at the input port. The computer communicates with a selected one of the plurality of peripheral devices upon sending a global address signal containing the address signal for each local data communication path forming the cascade of the at least one of the one or more interfaces coupling the computer to the selected one of the peripheral devices.

In carrying out the above objects, the present invention yet still further provides a peripheral system having a communication port for interfacing with a communication port of a computer. The system comprises a plurality of peripheral devices, each having a corresponding communication port, and one or more cascadable interfaces, each having an input port and a plurality of output ports. The one or more cascadable interfaces are coupled in a tree-like configuration such that the corresponding communication port of each of the plurality of peripheral devices is coupled to the communication port of the computer by a cascade of at least one of the one or more cascadable interfaces. Each of the interfaces is capable of providing a local data communication path between the input port and a selected one of the plurality of output ports based upon an address signal received at the input port. Each of the interfaces is further capable of providing a secondary address signal at each of the plurality of output ports capable of driving a like cascadable interface, wherein the secondary address signal is derived from a previous address signal received at the input port. The computer communicates with a selected one of the plurality of peripheral devices upon sending a global address signal containing the address signal for each local data communication path forming the cascade of at least one of the one or more interfaces coupling the computer to the selected one of the peripheral devices.

These and other features, aspects, and advantages of the present invention will become better understood with regard to the following description, appended claims, and accompanying drawings.

DETAILED DESCRIPTION OF THE INVENTION

Figure 1:
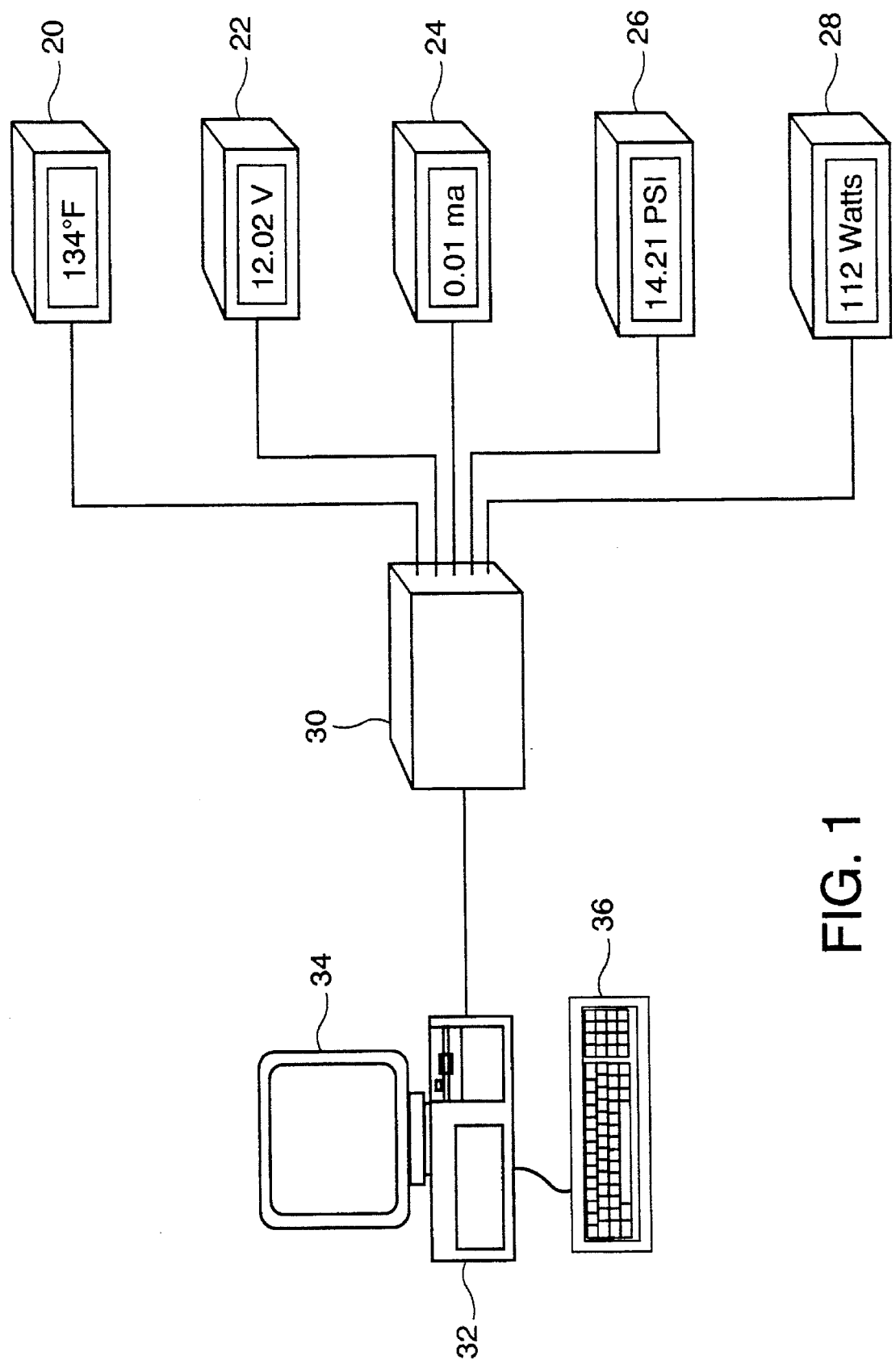
FIG. 1 shows a plurality of peripheral devices interfaced to a computer.

FIG. 1 pictorially shows a representative plurality of remote peripheral devices comprising a digital thermometer 20, a digital voltmeter 22, a digital ammeter 24, a digital pressure meter 26, and a digital power meter 28 interfaced via an addressable computer interface 30 to a computer 32. The computer 32 has a monitor 34 as an output interface to a user (not shown), and a keyboard 36 as a user input interface. The addressable computer interface 30 receives an address signal from the computer 32 in order to determine with which of the remote peripheral devices 20, 22, 24, 26, or 28 to establish a bidirectional data communication path. It is noted that the remote peripheral devices need not have addressing circuitry since all addressing operations are performed within the addressable computer interface 30. After receiving the address signal, the interface 30 establishes a bidirectional data communication path between the computer 32 and a selected peripheral device. Suppose that the voltmeter 22 is the device that was selected. The computer 32 can then signal the voltmeter 22 to perform functions such as transmitting its present measurement, changing the scale of measurement, clearing its memories, or initiating a calibration routine. The extent of the functions which can be performed depend on the capabilities of the device. Supposing that the computer inquires the present voltage measurement from the voltmeter 22, the voltmeter 22 would then transmit a data signal which represents the measurement through the interface 30 for reception by the computer 32. After a step such as processing or storing the measurement, the computer 32 could either signal the voltmeter 22 to perform a further function or could transmit a further address signal in order to access another of the devices.

Figure 2:
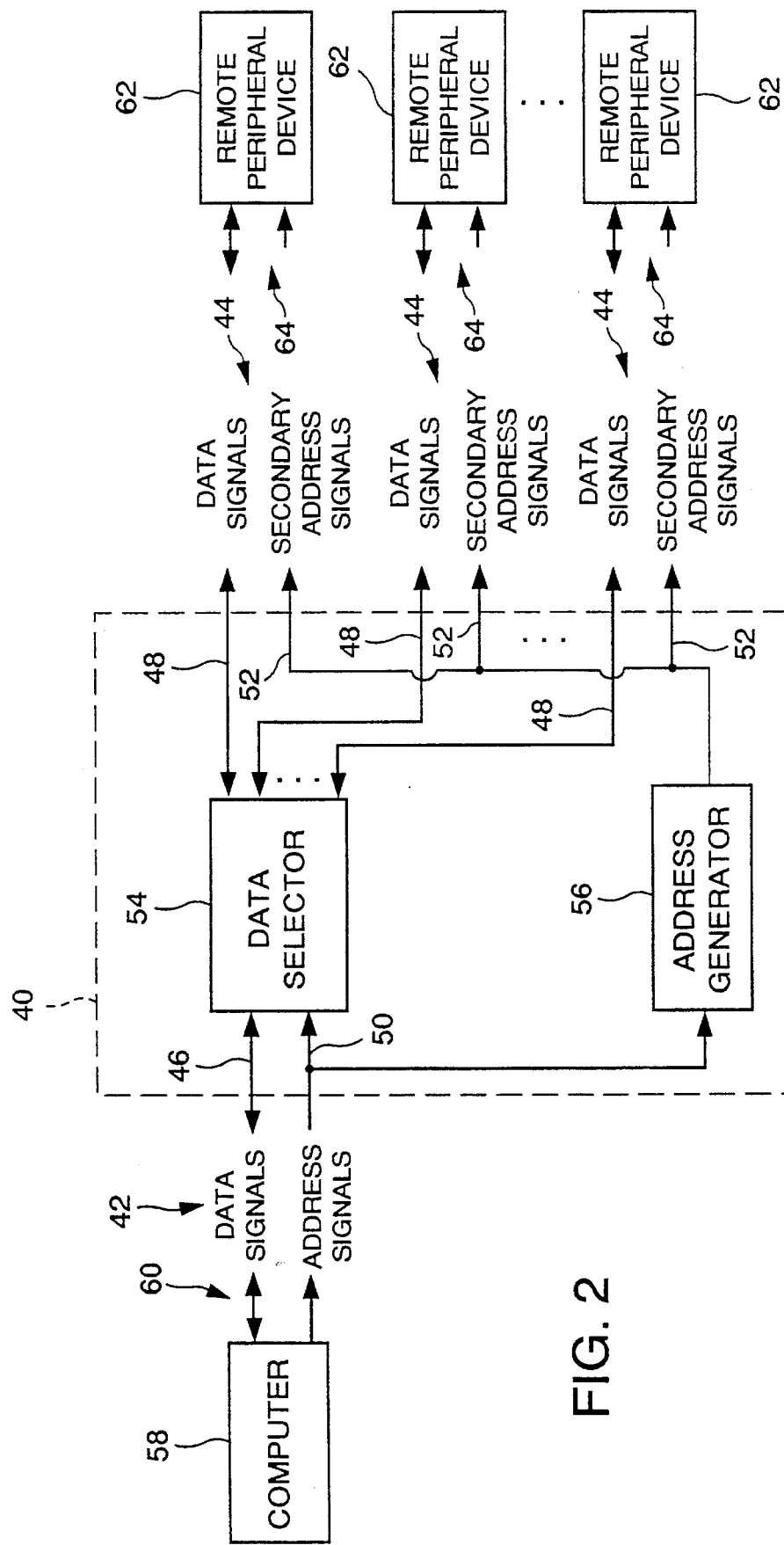
FIG. 2 shows a block diagram of a general embodiment of an interface apparatus of the present invention.

A block diagram of a general embodiment of an addressable computer interface 40 for providing a data communication path between an input port 42 and a selected one of a plurality of output ports 44 is given in FIG. 2. The input port 42 and the plurality of output ports 44 each comprise means for transferring data signals, represented by data signal lines 46 and 48, and each comprise means for transferring address signals, represented by address signal lines 50 and 52. This embodiment of the addressable computer interface 40 comprises a data selector circuit 54 and an address generator 56. The data selector circuit 54 receives an address signal, representatively received along the address signal line 50, which identifies the selected one of the plurality of output ports 44 to which the data communication path is to be provided. In response to the address signal received at the input port 42, the data selector circuit 54 establishes the data communication path between the input port 42 and the selected one of the plurality of output ports 44. The data communication path is established by a coupling of the data signals at the input port 42, representatively present at data signal line 46, with the data signals at the selected one of the plurality of output ports 44, representatively present at data signal line 48 for the selected one of the output ports 44.

The address generator 56 responds to the address signal received at the input port 42 by providing a secondary address signal, representatively transmitted along address lines 52, to each of the plurality of output ports 44 capable of driving a like addressable computer interface. The secondary address signal is derived from a previous address signal, representatively received via address line 50, received at the input port 42.

The embodiment of FIG. 2 is used for providing the data communication path between a computer 58 having a computer port 60 coupled to the input port 42, and a selected one of a plurality of remote peripheral devices 62, wherein each remote peripheral device includes a port 64 for coupling to a corresponding output port. The transmission of the secondary address signal allows the addressable computer interface 40 to be cascadably interfaced to a like addressable computer interface, wherein the input port 42 of the like addressable computer interface is coupled to one of the plurality of output ports 44 of the interface 30. Further remote devices can then be coupled to the computer 58 by the output ports of the like addressable computer interface.

Figure 3:
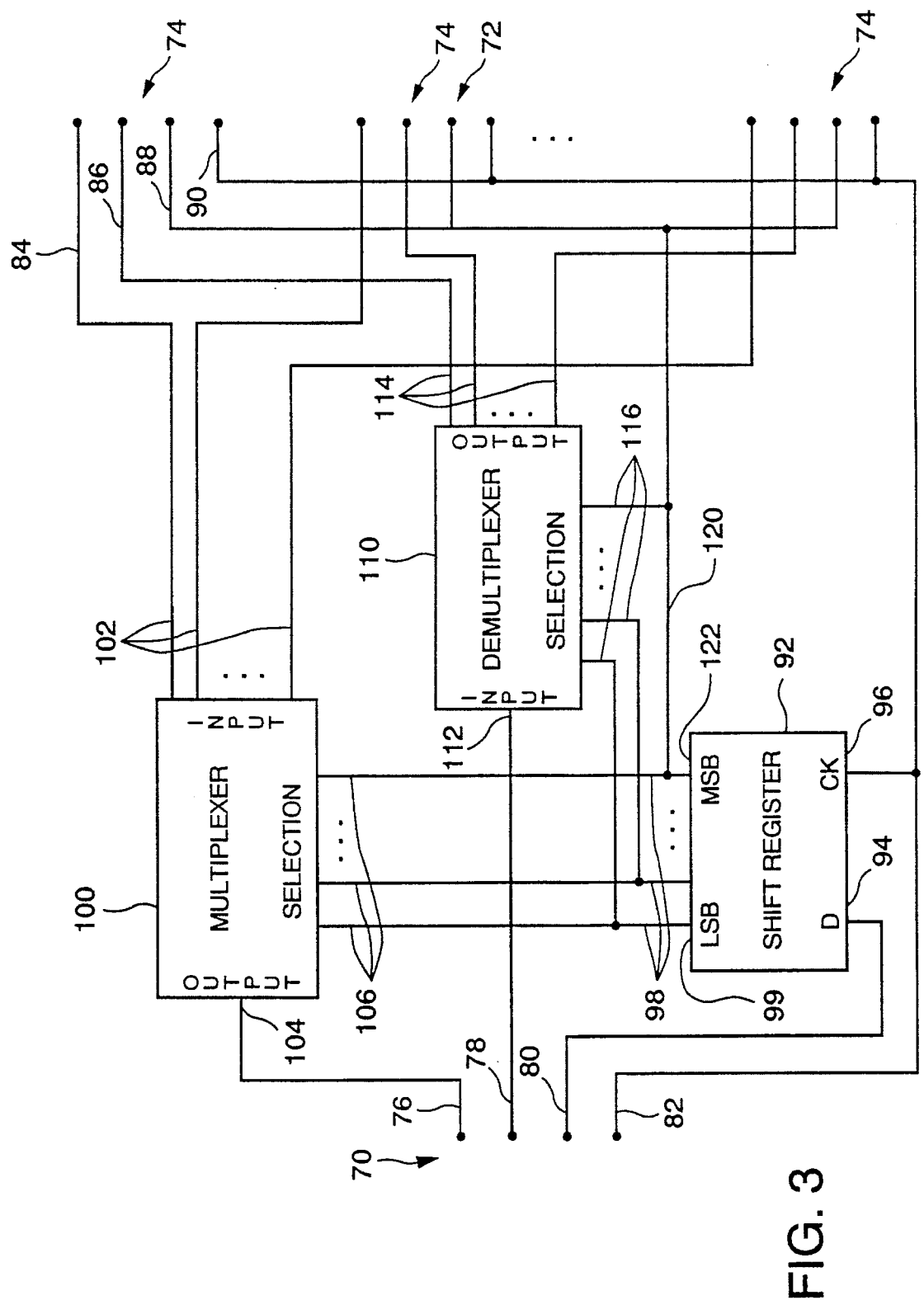
FIG. 3 shows a block diagram of a more specific embodiment of the interface apparatus of the present invention.

A block diagram of an embodiment of the addressable computer interface for providing a serial data communication path between an input port 70 and a selected one output port 72 of a plurality of output ports 74 is given in FIG. 3. The input port 70 is a serial data port comprising a data receive line 76, a data transmit line 78, a first control line 80, and a second control line 82. Each of the plurality of output ports 74 is a serial data port comprising a data transmit line 84, a data receive line 86, a first control line 88, and a second control line 90.

A shift register 92, having a data input 94, a clock input 96, and a plurality of outputs 98, is used for converting address signals received along the first and second control lines 80 and 82 to an address identifying the selected one output port 72. The data input 94 is coupled to the first control line 80 of the input port 70 and the clock input 96 is coupled to the second control line of the input port 70. In response to a clock pulse received at the input port 70 along the second control line 82, the shift register 92 shifts the contents of the register by one bit position, thus shifting the values of the plurality of outputs 98 by one output position. The shift register 92 then inserts a bit derived from a signal present at the first control line 80 of the input port 70 into a resulting open register position, which can be observed at a least significant bit output 99.

A multiplexer 100, having a plurality of multiplexer inputs 102, a multiplexer output 104, and a plurality of selection inputs 106, is used for providing a data transmission path between the data transmit line 84 of the selected one of the plurality of output ports 74 and the data receive line 76 of the input port 70. Each of the plurality of multiplexer inputs 102 is coupled to a corresponding data transmit line 84 for each of the plurality of output ports 74. The multiplexer output 104 is coupled to the data receive line 76 of the input port 70. Each of the plurality of selection inputs 106 is coupled to a corresponding one of the plurality of outputs 98 of the shift register 92.

A demultiplexer 110, having a demultiplexer input 112, a plurality of demultiplexer outputs 114, and a plurality of selection inputs 116, is used for providing a data transmission path between the data transmit line 78 of the input port 70 and the data receive line 86 of the selected one of the plurality of output ports 74. The demultiplexer input 112 is coupled to the data transmit line 78 of the input port 70. Each of the plurality of demultiplexer outputs 114 is coupled to a corresponding data receive line 86 for each of the plurality of output ports 74. Each of the plurality of selection inputs 116 is coupled to a corresponding one of the plurality of outputs 98 of the shift register 92.

In this embodiment, the data selector 54 is provided by the demultiplexer 110 and the multiplexer 100, wherein the bidirectional data communication path between the input port 70 and the selected one 72 of the output ports 74 is formed by the unidirectional data transmission path provided by the demultiplexer 110 and the unidirectional data transmission path provided by the multiplexer 100.

To provide secondary address signals, the first control line 88 of each of the plurality of output ports 74 is coupled to a selected output 120 of the plurality of outputs 98, and the second control line 90 of each of the plurality of output ports 74 is coupled to the second control line 82 of the input port 70. In order, both, to employ all of the plurality of outputs 18 for addressing and to provide for independent addressing of a like interface cascadably connected to the cascadable computer interface, a most significant bit output 122 is chosen as the selected one of the plurality of outputs coupled to the first control line 88. Hence, this configuration is preferred, although alternative embodiments are generally not limited thereto.

Figure 4:
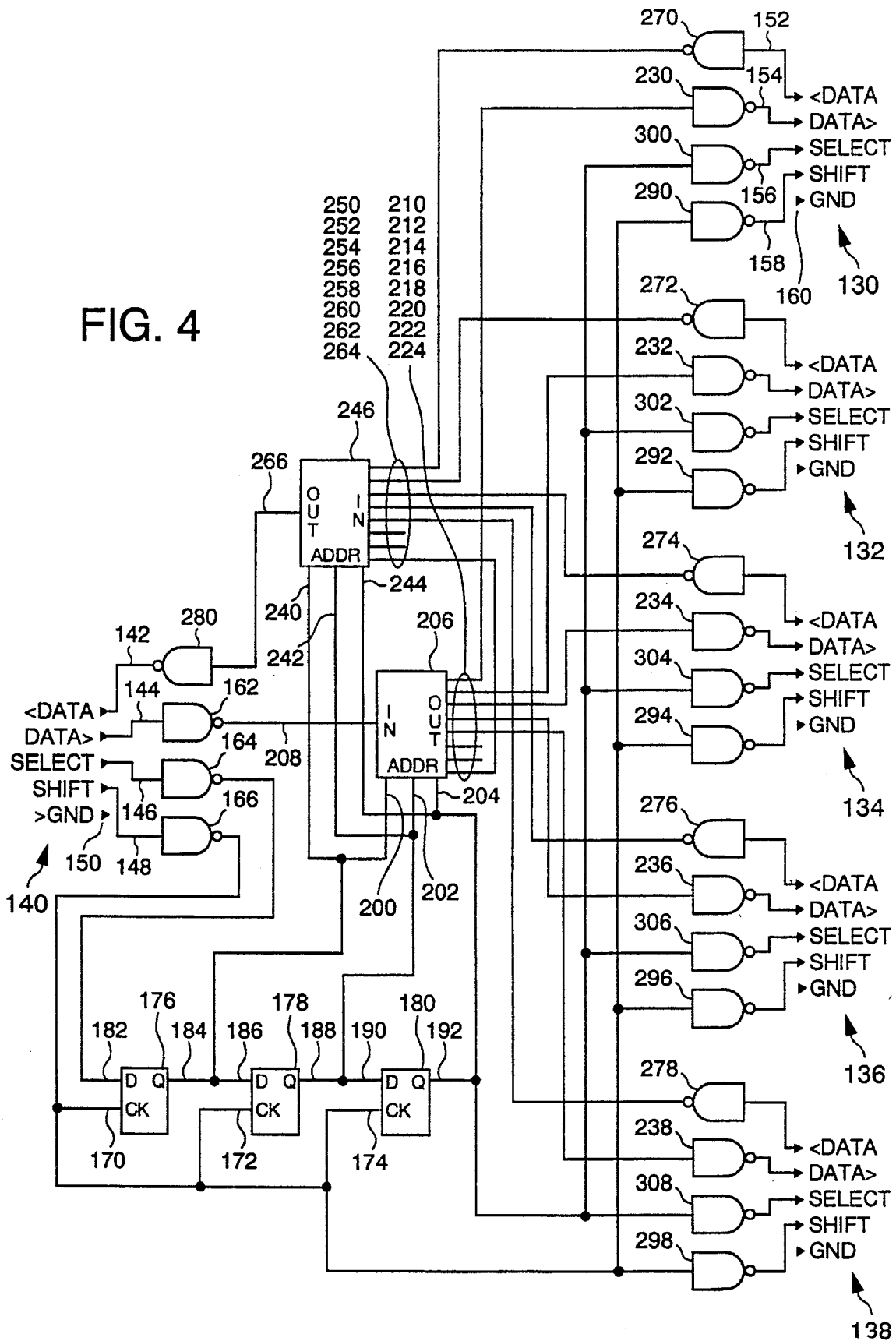
FIG. 4 shows a schematic drawing of a circuit embodiment of the present invention.

A schematic drawing of a circuit embodiment of the present invention is given in FIG. 4. This embodiment provides five serial output ports 130, 132, 134, 136, and 138, addressable from a single serial input port 140 in a manner to conform to the RS-232 information interchange specification. The input port comprises a data receive line 142, a data transmit line 144, an address select line 146, an address shift line 148, and a common ground line 150. Each of the five serial output ports 130, 132, 134, 136, and 138 comprises a data transmit line 152, a data receive line 154, an address select line 156, an address shift line 158, and a common ground line 160. The input port 140 is wired in the DCE configuration for coupling with a mating serial port wired in the DTE configuration. Similarly, each of the five output ports 130, 132, 134, 136, and 138 is wired in the DTE configuration for coupling with a mating serial port wired in the DCE configuration. As a result, the embodiment is hermaphroditic in that the input port of an interface can be mated with one of the five output ports of a second identical interface. In terms of the RS-232 specification, the data receive line 142 is coupled to the received-data (RD) pin, the data transmit line 144 is coupled to the transmitted-data (TD) pin, the address select line 146 is coupled to the data-terminal-ready (DTR) pin, the address shift line 148 is coupled to the request-to-send (RTS) pin, and the common ground line 150 is coupled to the signal ground pin.

For the purpose of clarity, it is noted that the use of the words "transmit" and "receive" for describing a data line is referenced in terms of activity of a device coupled to the port containing the line. Specifically, the data transmit line 144 of the input port is the line on which data is transmitted by the computer; and the data receive line 142 of the input port is the line on which data is received by the computer. Similarly, the data transmit line 152 of each of the five output ports is the line on which data is transmitted by a corresponding remote peripheral device; and the data receive line 154 of each of the five output ports is the line on which data is received by the corresponding remote peripheral device.

The data transmit line 144, the address select line 146, and the address shift line 148 are each applied to a corresponding one of RS-232 line receiver circuits 162, 164, and 166, respectively. The RS-232 line receiver circuits 162,164, and 166, convert RS-232 logic signals typically based on +12 V and −12 V levels, but generally based on ±3 V to ±25 V levels, to TTL logic signals based on 5 V and 0 V levels, and further provide the necessary termination impedance (i.e., input impedance) of between 3 kΩ to 7 kΩ for RS-232 lines. The line receiver circuits are included to allow conventional TTL logic gates to be employed in processing signals received at the input port and the five output ports.

The output of line receiver 166 is applied to clock inputs 170, 172, and 174 of corresponding first, second, and third D-type flip-flop integrated circuits 176, 178, and 180, respectively. The first, second, and third flip-flops 176, 178, and 180 are connected in cascade to form a three-bit shift register circuit. Specifically, the output of line receiver 164 is applied to a data input 182 of the first flip-flop 176, an output 184 of the first flip-flop 176 is connected to an input 186 of the second flip-flop 178, and an output 188 of the second flip-flop 178 is connected to an input 190 of the third flip-flop 180. In response to a clock pulse received at the address shift line 148 of the input port, the resulting shift register shifts the contents of the register by one bit position, i.e., an output 192 of the third flip-flop 180 contains the previous signal at the output 188 of the second flip-flop 178, the output 188 of the second flip-flop 178 contains the previous signal at the output 184 of the first flip-flop 176, and the output 184 of the first flip-flop 176 contains an inverted value of the signal present at the address select line 146.

The flip-flop outputs 184, 188, and 192 are each connected to a corresponding one of selection inputs 200, 202, and 204 of a demultiplexer circuit 206. The demultiplexer circuit 206 is of a one-of-eight data selector variety having a data input line 208 and eight output lines 210, 212, 214, 216, 218, 220, 222, and 224. The demultiplexer input line 208 is coupled to the data transmit line 144 by the output of the line receiver 162. Five output lines 210, 212, 214, 216, and 218 of the eight demultiplexer output lines 168 are each coupled to the data receive line 154 of a corresponding one of the five output ports by corresponding RS-232 line driver circuits 230, 232, 234, 236, and 238, respectively. Each RS-232 line driver circuit converts the processed TTL logic signals, based on +5 V and 0 V, back into RS-232 logic signals based on +12 V and −12 V. As a result, the demultiplexer circuit 206 provides a data transmission path from the data transmit line 144 of the input port 140 to the data receive line 154 of a selected one of the five output ports based upon a previous three bits clocked into the shift register. Moreover, the demultiplexer circuit 206 inhibits the transmission of data from the data transmit line 144 to the data receive line 154 of any of the four non-selected output ports. Further, the data transmission path accepts RS-232 logic level signals at the input port and produces RS-232 logic level data signals at the selected one of the five output ports.

The flip-flop outputs 184, 188, and 192 are also each connected to a corresponding one of selection inputs 240, 242, and 244 of a multiplexer circuit 246. The multiplexer circuit 246 is of a 3-to-8 line decoder variety having eight data input lines 250, 252, 254, 256, 258, 260, 262, and 264 and an output line 266. Five input lines 250, 252, 254, 256, and 258 of the eight multiplexer input lines are each coupled to the data transmit line 152 of a corresponding one of the five output ports by corresponding RS-232 line receiver circuits 270, 272, 274, 276, and 278, respectively. Each of the RS-232 line receiver circuits converts RS-232 logic signals into TTL logic signals for processing by the multiplexer 246. The multiplexer output line 266 is coupled to the data receive line, 142 by a line driver 280 to produce RS-232 logic signals. Based upon the previous three bits clocked into the shift register, the multiplexer circuit 246 provides a data transmission path from the data transmit line 152 of the selected one of the five output ports to the data receive line 142 of the input port 140. Similar to the operation of the demultiplexer 206, the multiplexer circuit 246 inhibits the transmission of data from the data transmit line 152 of any of the four non-selected output ports to the data receive line 142 of the input port 140.

The address shift line 158 for each of the five output ports 130, 132, 134, 136, and 138 is coupled to the output of line receiver 166 by line driver circuits 290, 292, 294, 296, and 298, respectively. This produces, at each of the five output ports, a regenerated version of a clocking signal received at the address shift line 148 of the input port 140. The address select line 156 for each of the five output ports 130, 132, 134, 136, and 138 is coupled to the output 192 of the third flip-flop 180 by line driver circuits 300, 302, 304, 306, and 308. As a result, a regenerated version of a previous signal present at the address select line 156, specifically the signal present three clock pulses in the past, is provided to each of the five output ports 130, 132, 134, 136, and 138. The combination of the signals at address shift line 156 and the address select line 158 provide secondary address signaling for driving the input port of a like computer interface. Thus, in the embodiment of FIG. 4, all of the five output ports are capable of driving a like computer interface. It should be emphasized that, although the address signals received at the input port direct data signals to and from only the selected one of the output ports, the secondary address signaling is provided to each of the output ports including the non-selected output ports.

The embodiment of the present invention in FIG. 4 further has means for enabling a computer interfaced to its input port to detect its presence using standard data communication means. A first means of detecting presence is produced by one output 224 of the demultiplexer 206 being coupled to one input 264 of the multiplexer 246. The output 224 is selected from the three demultiplexer outputs 220, 222, and 224 that are not coupled to an output port, and the input 264 is similarly selected from one of the three multiplexer outputs 260, 262, and 264 that is not coupled to an output port. Further, the output 224 and input 264 are paired so that they are both enabled for the same selection inputs. Similarly, a second means of detecting presence is produced by leaving input 262 open.

The first and second means for detecting presence are employed as follows. The computer transmits address signals to select the first presence detecting means. The computer then sends data signals along the data transmit line and compares the sent data signals to the data signals at the data receive line. If the sent and received data signals are equivalent, then the computer concludes that either the TD pin of the computer is directly connected to the RD pin of the computer, or that the interface apparatus is connected to the port of the computer. Next, the computer transmits address signals to select the second presence detecting means. The computer follows by sending out data signals along the data transmit line. If the transmitted data signals are not present at the data receive line, then the computer concludes that the interface apparatus is connected to the port of the computer, and further concludes that there is no external loopback between the TD pin and the RD pin of the computer other than the controlled loopback provided by the first presence detecting means. If the transmitted data signals were present for the second presence detecting means, then the computer would conclude that there is an external loopback between the TD pin and the RD pin.

One with ordinary skill in the art will recognize that the present invention is not limited to the circuit embodiment having five output ports. The number of output ports can be increased by employing a greater number of cascaded flip-flops to form the shift register, and substituting a demultiplexer and a multiplexer having a suitable number of selection lines. Moreover, it is obvious that a discrete shift register integrated circuit can be substituted for the cascaded flip-flops.

Further, it would be obvious to one with ordinary skill in the art that the use of TTL logic components in the circuit embodiment of the present invention is not to be construed as a limitation. MOS-based logic components could be employed with substantially equivalent functionality. If an embodiment of the invention is to operate with a wide range of supply voltages, or with low power dissipation, then the MOS-based components would be preferred over TTL-based components.

Figure 5:
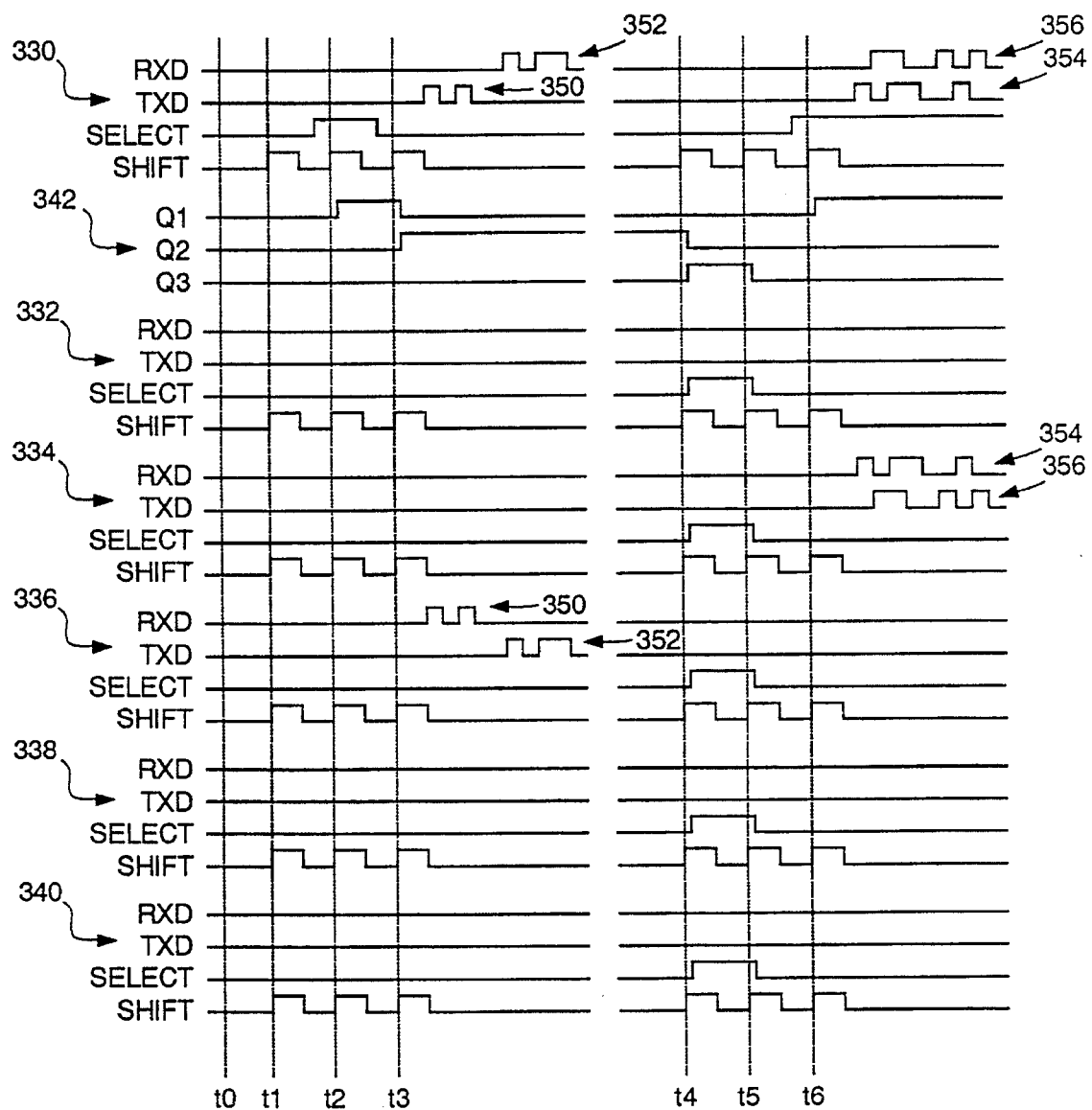
FIG. 5 shows a timing diagram for the circuit embodiment of the present invention.

A timing diagram illustrating the operation of the circuit embodiment of the present invention is shown in FIG. 5. The signals present on the data receive line (RXD), data transmit line (TXD), address select line (SELECT), and address shift line (SHIFT) are shown for the input port 330 and each of the five output ports 332, 334, 336, 338, 340. Also shown are the signals present at the output of the first (Q1), second (Q2), and third (Q3) flip-flops 342. Each signal is drawn to indicate logical values of "0" or "1" vs. time rather than the voltage of each signal vs. time. This convention is selected since a negative logic is employed in the RS-232 specification, while a positive logic is used in the demultiplexer, multiplexer, and flip-flops. The voltage polarity of the RS-232 signals can be determined based on FIG. 5 by simply inverting the RXD, TXD, SELECT, and SHIFT signals. For ease in designating each of the output ports, a unique channel number from 1 to 5 is assigned to each output port. Specifically, output port 130 is channel number 1, output port 132 is channel number 2, output port 134 is channel number 3, output port 136 is channel number 4, and output port 138 is channel number 5.

For illustration, the output of each of the first, second, and third flip-flops is assumed to be initially a binary "0" at time t0. Suppose that a data communication path from the input port to channel 3, corresponding to output port 134, is desired. Within the computer, the channel number "3" is reduced by 1, yielding "2", and then converted into a three-bit binary number. The three-bit representation for "2" base 10 is "010". Next, for each of the bits in reverse order (i.e., from right to left), the computer sets the RTS line to be logical "0", followed by setting the DTR line to be equal to the bit value, and finally raising the RTS line to logical "1". Since the DTR line is coupled to the SELECT line of the interface, and the RTS line is coupled to the SHIFT line of the interface, this process acts to load the shift register with the three-bit representation of the channel number. Referring back to FIG. 5, the rightmost "0" is loaded at time t1, the "1" is loaded at time t2, and the leftmost "0" is loaded at time t3, resulting in the output (Q1, Q2, Q3) of the three flip-flops being "010". As a result, the data communication path is established between the input port and the selected output port 134 at time t3.

The data communication path is illustrated by a first data signal 350, transmitted by the computer along the data transmit line of the input port, being present at the data receive line of the selected output port 134. If an instrumentation device is coupled to the output port 134, the first data signal 350 would represent a command to the device, such as activate data transmission, clear device memories, or transmit contents of device memories. In response, the instrumentation device would transmit a second data signal 352 along the data transmit line of the selected output port 134. The second data signal 352 typically would be representative of some measurement obtained by the device. The computer can receive the second data signal 352 along the data receive line of the input port.

Next, suppose that after a length of data transmitted by the peripheral device coupled to the output port 134, it is desired to communicate with a peripheral device coupled to output port 132, corresponding to channel 2. Once again, the channel number "2" is reduced by 1 and converted into a three-bit representation. The resulting three bits, "001", are loaded into the shift register in reverse order; a "1" is loaded at time t4, a "0" is loaded at time t5, and another "0" is loaded at t6. At time t6, a data communication path is established between the input port and the selected output port 132 corresponding to channel 2. In order to further illustrate the bidirectional nature of the communication path, a third data signal 354 transmitted by the computer is shown to be receivable at the peripheral device at the data receive line of the selected output port 132, and simultaneously, a fourth data signal 356 transmitted by the peripheral device is shown to be receivable at the computer at the data receive line of the input port. Moreover, the third data signal 354 transmitted by the computer is receivable only by the peripheral device at the selected output port 132 as illustrated by the RXD line for each non-selected output port being inactive after time t6.

The preceding establishment of channel 2 further illustrates the generation of the secondary address signal at each of the output ports, wherein the secondary address signal is derived from a previous address signal received at the input port. At time t4, the SELECT line for each of the output ports is "0" and the SHIFT line for each of the output ports is a transition from "0" to "1". This corresponds to the previous address signal received at the input port at time t1, namely the signal at the SELECT line being "0" and the signal at the SHIFT line being a transition from "0" to "1". Similarly, at time t5, the SELECT line is "1" and the SHIFT line is a transition from "0" to "1" for each of the output ports, which is equivalent to the address signal received at the input port at time t2. Finally, the secondary address signal at time t6, SELECT being "0" and SHIFT being a transition from "0" to "1", is equivalent to the previous address signal received at the input port at time t3. Hence, if a second cascadable computer interface is coupled to any of the output ports, a bidirectional communication path will be established between the input port of the second interface and the output port of the second interface corresponding to channel 3. Moreover, if the second cascadable computer interface is coupled to channel 2 of the first interface, a bidirectional data communication path is established between the input port of the first interface and the output port corresponding to channel 3 of the second cascadable interface.

Figure 6:
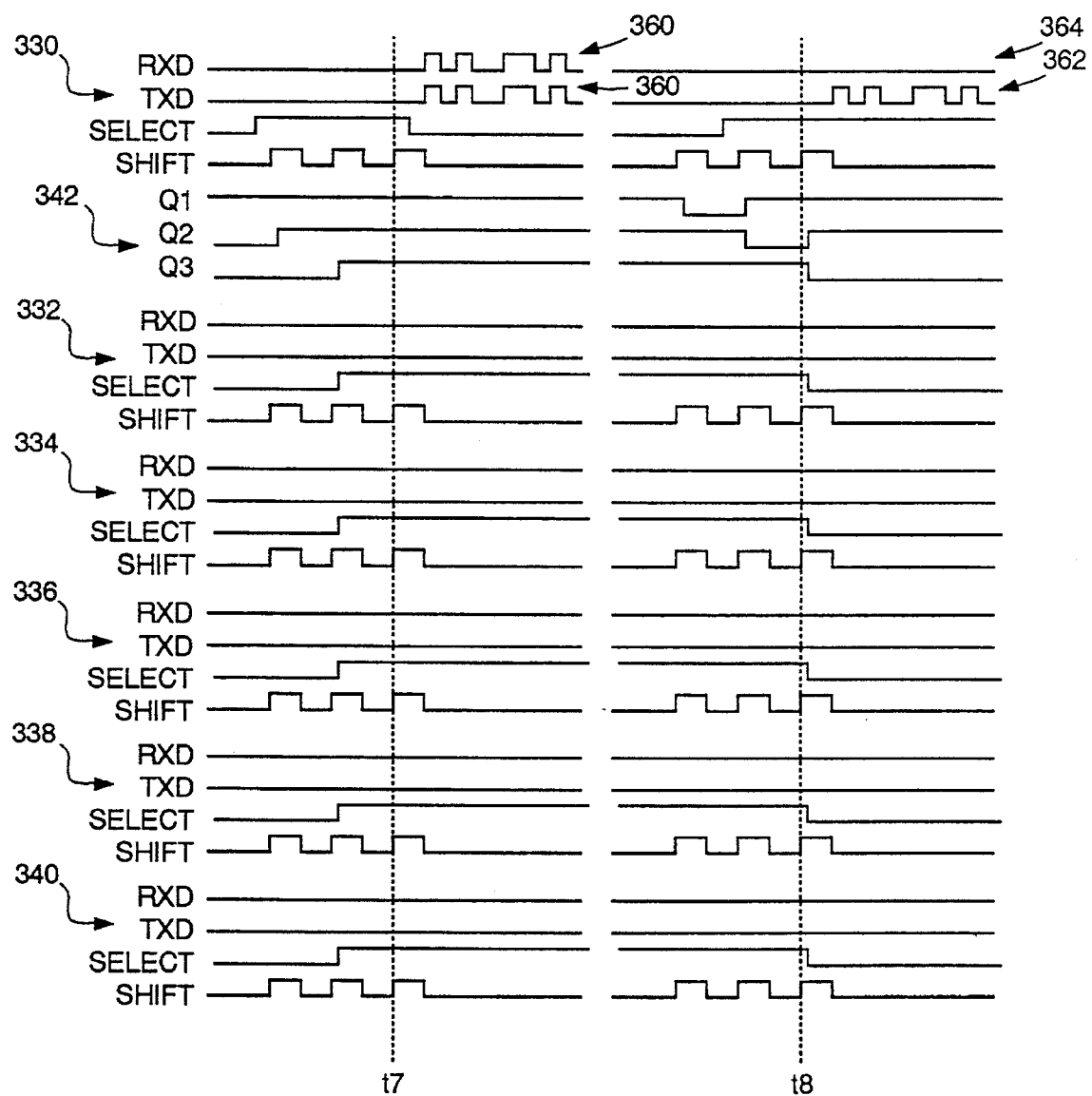
FIG. 6 shows a timing diagram illustrating a presence detection aspect of the present invention.

A timing diagram illustrating the operation of the presence detecting means in the circuit embodiment of the present invention is shown in FIG. 6. The first means for detecting presence is assigned to channel number 8, and the second means for detecting presence is assigned t6 channel number 7. The computer transmits address signals along the SELECT and SHIFT lines of the input port 330, to enable channel number 8 at time t7. After time t7, the computer sends a fifth data signal 360 along the data transmit line of the input port. The first presence detecting means directs the fifth data signal 360 back to the input port along the data receive line. Next, the computer enables the second presence detecting means by transmitting address signals along the SELECT and SHIFT lines to enable channel number 7. The computer follows by sending out a sixth data signal 362 along the data transmit line of the input port. The second presence detecting means inhibits the sixth data signal 362 from being directed to the data receive line of the input port. This is evident by the seventh data signal 364 directed back to the input port along the data receive line.

Figure 7:
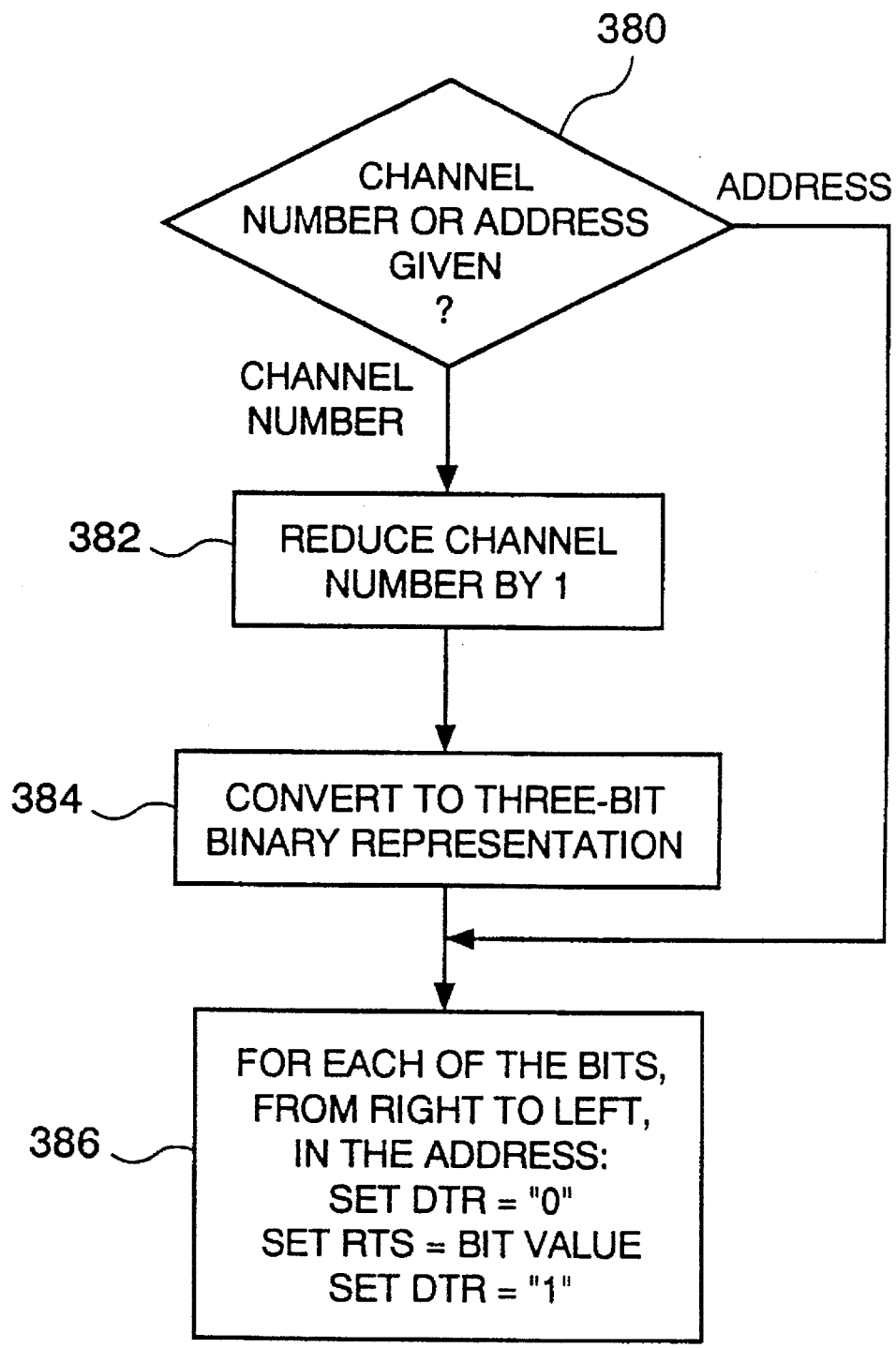
FIG. 7 shows a flow chart of a method of addressing.

A flow chart detailing a method of addressing the circuit embodiment of the present invention is shown in FIG. 7. This method allows addressing based on either a base 10 channel number or a binary address. In conditional block 380, the method first determines whether a base 10 channel number or a binary address is given. If a base 10 channel number is given, then the base 10 channel number is reduced by one in block 382. Next, the reduced base 10 channel number is converted to a three-bit binary representation in block 384. Block 386, in which the address signaling is performed, is executed if a binary address was given in block 380 or after the conversion of the base 10 channel member in block 384. The address signaling is performed as follows. For each of the bits from right to left in the binary address, DTR is set to "0", RTS is set to the bit value, followed by DTR being set to "1".

Figure 8:
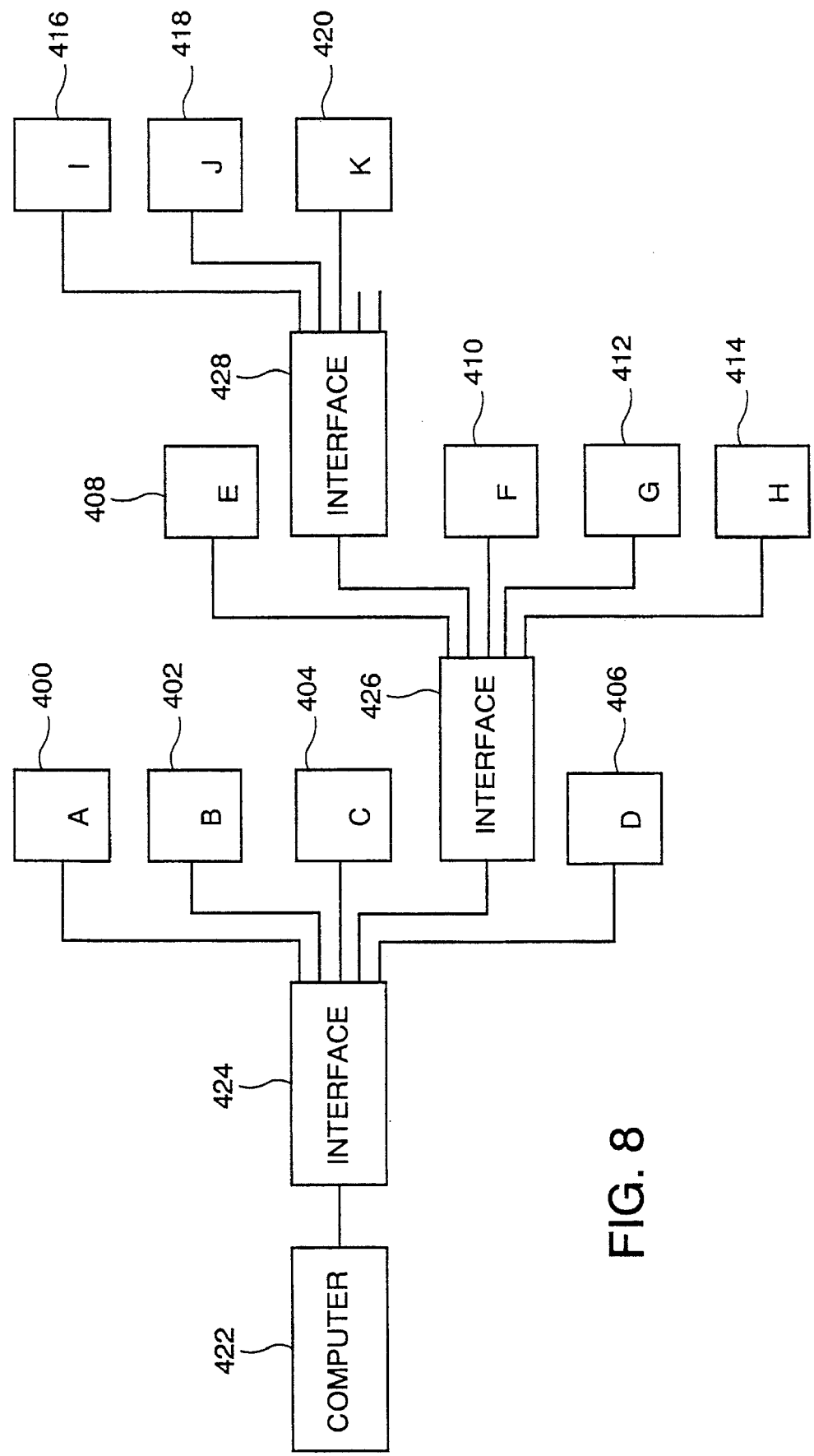
FIG. 8 shows a block diagram of the interfaces cascaded in a tree-like structure to couple a computer to a plurality of remote devices.

A block diagram in FIG. 8 shows an example of a system for providing a communication path between a computer and a selected one of a plurality of peripheral devices. In general, the system comprises one or more cascadable interfaces having an input port and a plurality of output ports. Each of the interfaces is capable of providing a local data communication path between the input port and a selected one of the plurality of output ports based upon an address signal received at the input port. Furthermore, each of the interfaces is capable of providing a secondary address signal at each of the plurality of output ports, the secondary address signal being based upon a previous address signal received at the input port. The cascadable interfaces are generally coupled in a tree-like configuration such that each of the plurality of peripheral devices is coupled to the computer by a cascade of at least one of the one or more cascadable interfaces.

The example in FIG. 8 shows eleven peripheral devices 400, 402, 404, 406, 408, 410, 412, 414, 416, 418, and 420, interfaced with a computer 422 using three cascadable interfaces 424, 426, and 428. The input port of the first interface 424 is coupled to the computer 422. The five output ports of the first interface 424 are coupled to peripheral A 400, peripheral B 402, peripheral C 404, the input of the second interface 426, and peripheral D 406, respectively. The five output ports of the second interface 426 are coupled to peripheral E 408, the input of the third interface 428, peripheral F 410, peripheral G 412, and peripheral H 414, respectively. Three of the five output ports of the third interface 428 are employed for coupling peripheral I 416, peripheral J 418, and peripheral K 420, respectively, thereto. The resulting configuration is tree-like in that each of the eleven peripheral devices is coupled to the computer by a single corresponding cascade of at least one of the three cascadable interfaces. For example, peripheral D 406 is coupled to the computer by the cascade of the first interface 424, peripheral E 408 is coupled to the computer 422 by the cascade of the first interface 424 and the second interface 426, and peripheral J 418 is coupled to the computer by the cascade of the first, second, and third interfaces 424, 426, and 428.

The following table shows the resulting addresses for each of the eleven peripheral devices shown in FIG. 8. From the table, it is immediately apparent that the number of bits in the address is not the same for each device. In general, a global address signal which initiates the data communication path between the computer and the selected one of the plurality of peripheral devices is a concatenation of a local address signal for each local communication path in the corresponding cascade. For example, the global address signal for peripheral E 408 is the local address to provide a local communication path from the input port to the channel 4 output port in the first interface, "011", concatenated with the local address which provides a local communication path from the input port of the second interface 426 to the channel 1 output port, "000"; therefore, the resulting global address is "011000".

TABLE I

| PERIPHERAL | ADDRESS | DTR BIT SEQUENCE |
|---|---|---|
| A | 000 | 000 |
| B | 001 | 100 |
| C | 010 | 010 |
| D | 100 | 001 |
| E | 011 000 | 000110 |
| F | 011 010 | 010110 |
| G | 011 011 | 110110 |
| H | 011 100 | 001110 |
| I | 011 010 000 | 000010110 |
| J | 011 010 001 | 100010110 |
| K | 011 010 010 | 010010110 |

One with ordinary skill in the art will recognize that the configuration of the system presented in FIG. 8 is merely for illustrative purposes, and is not limiting with respect to the number of interfaces nor number of peripheral devices that can be configured using embodiments of the present invention. Moreover, systems for providing the data communication path between the computer and the selected one of the plurality of peripheral devices are not limited to cascadable interfaces having five output ports, nor limited to the specific protocol of secondary addressing employed.

Figure 9:
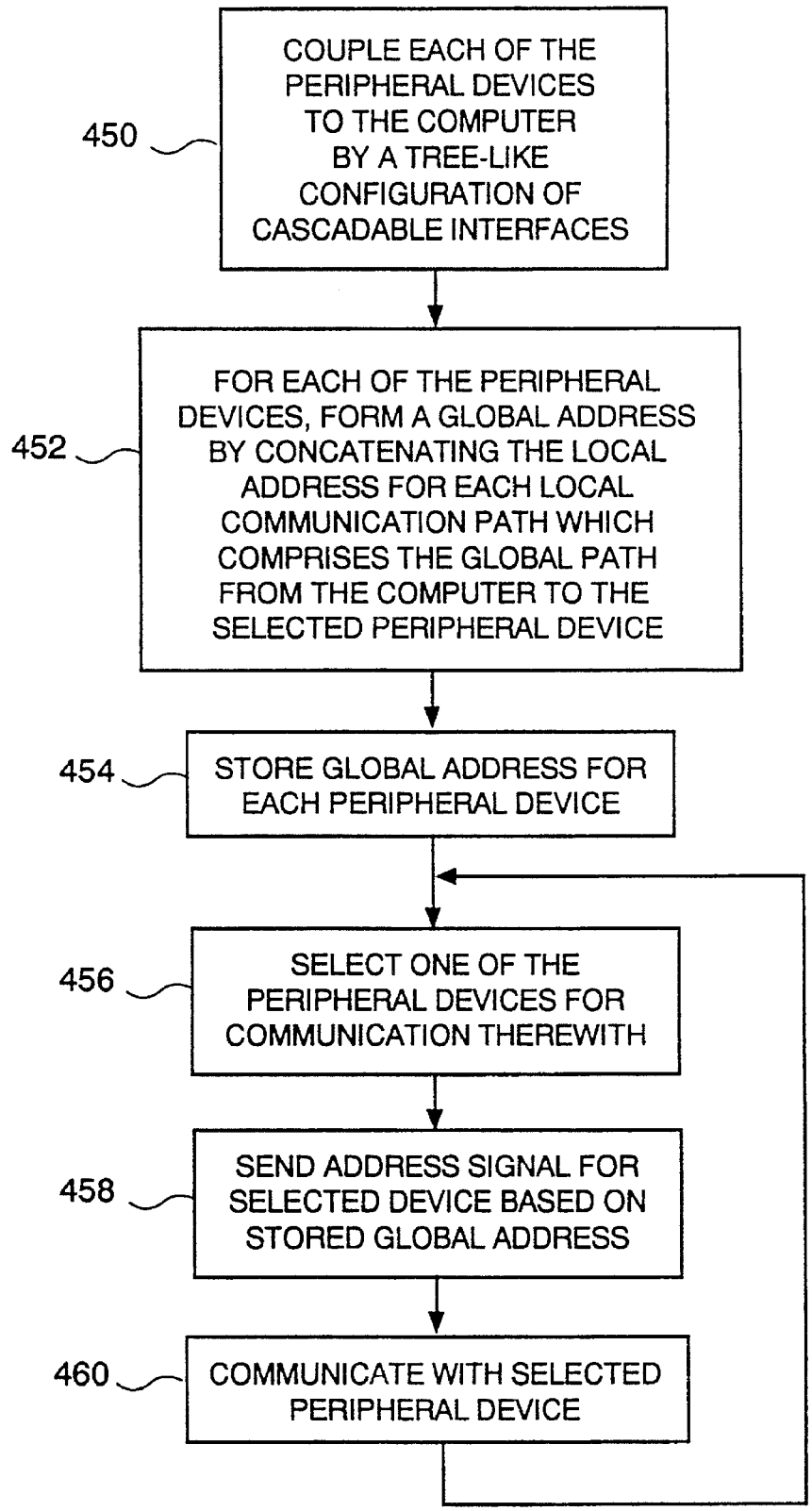
FIG. 9 shows a flow chart of a method of global addressing.

A flow chart illustrating a method of providing a data communication path between a computer and a selected one of a plurality of peripheral devices is shown in FIG. 9. In block 450, each of the peripheral devices is coupled to the computer by a tree-like configuration of cascadable interfaces. Next, in block 452, a global address is formed for each of the peripheral devices. The global addresses are formed by concatenating the local address for each local communication path which comprises the global path from the computer to the peripheral device. In block 454, the global address for each peripheral device is stored in the computer. It is noted that the steps in blocks 450, 452, and 454 can be performed off-line during an initial set-up of the system. The computer then selects one of the peripheral devices for communication therewith in block 456. The computer follows by sending an address signal based on the stored global address for the selected device in block 458. After the address signal has been sent, the computer can communicate with the selected peripheral device using transmitted and received data signals in block 460. After communication between the computer and the selected peripheral device has completed, the method returns to block 456 enabling the computer to select another one of the peripheral devices with which to communicate.

Figure 10:
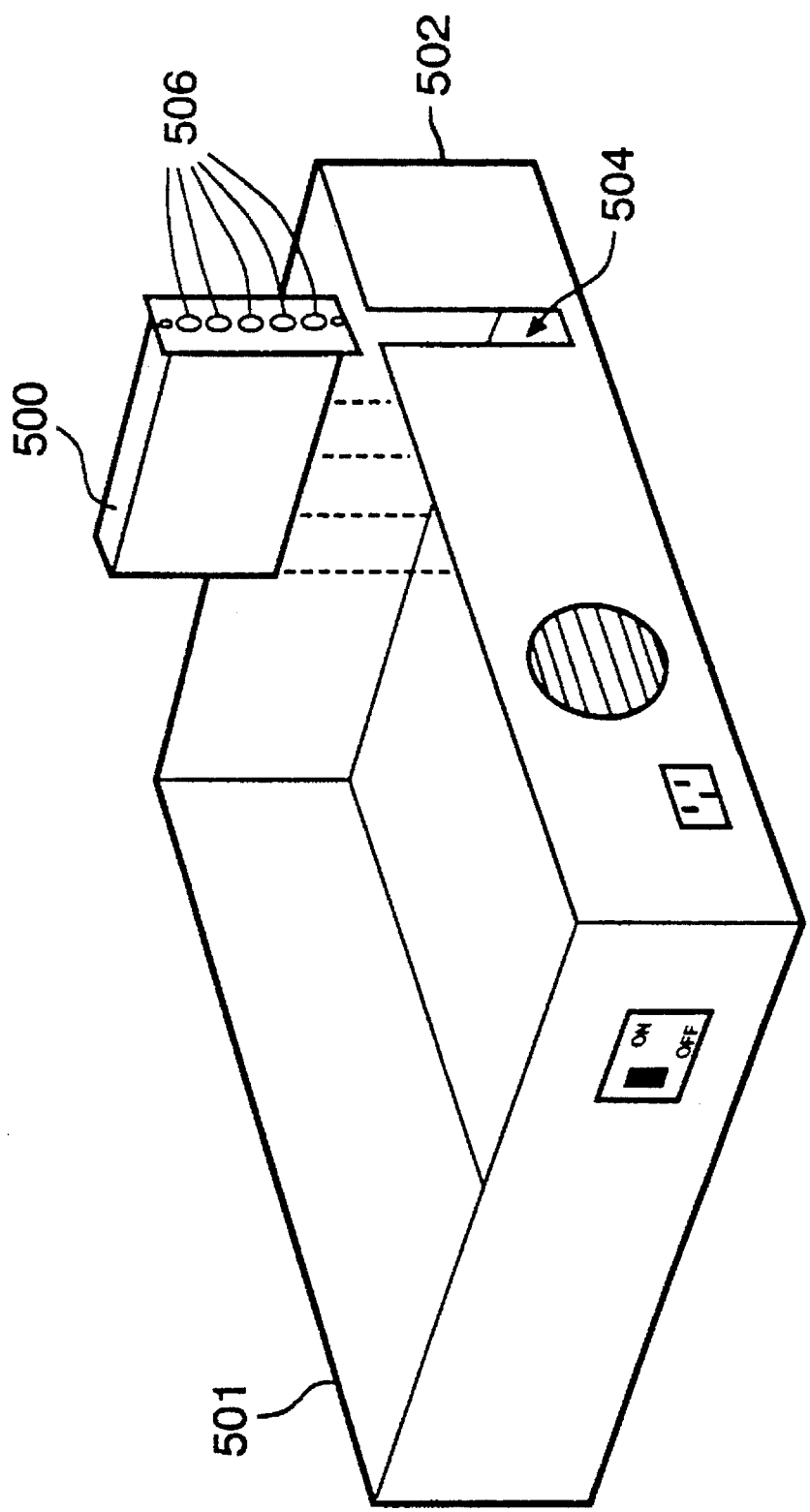
FIG. 10 shows an interface card for installation in an expansion port of a personal computer.

FIG. 10 shows an interface card embodiment of the present invention. An interface card 500, which contains circuitry for providing an addressable, cascadable interface, can be connected to a computer 502 via an expansion slot 504. The interface card 500 has five RS-232 connectors 506 accessible from the back of the computer 502 upon installation of the card 500 in the expansion slot 504. Each of the connectors 506 is coupled to a corresponding one of the five output ports of the interface. The connectors 506 can be of the D9, D25, or DIN variety. Of course, any limitation to either the size of the connectors 506 or the number of connectors 506, imposed by the area available at the back of the interface card 500 can be overcome by providing a pigtail-type connection of the connectors 506 to the interface card 500.

It is obvious to one with ordinary skill in the art that embodiments of the present invention are not limited to the RS-232 interface standard. For example, the RS-422 interface standard, which allows for an increased transmission rate and greater port-to-port cable lengths than with RS-232, could be the basis for an embodiment employing differential transmitter and receiver circuits. Moreover, embodiments of the present invention are not limited to serial communication ports, but could be applied to parallel communication ports.

Figure 11:
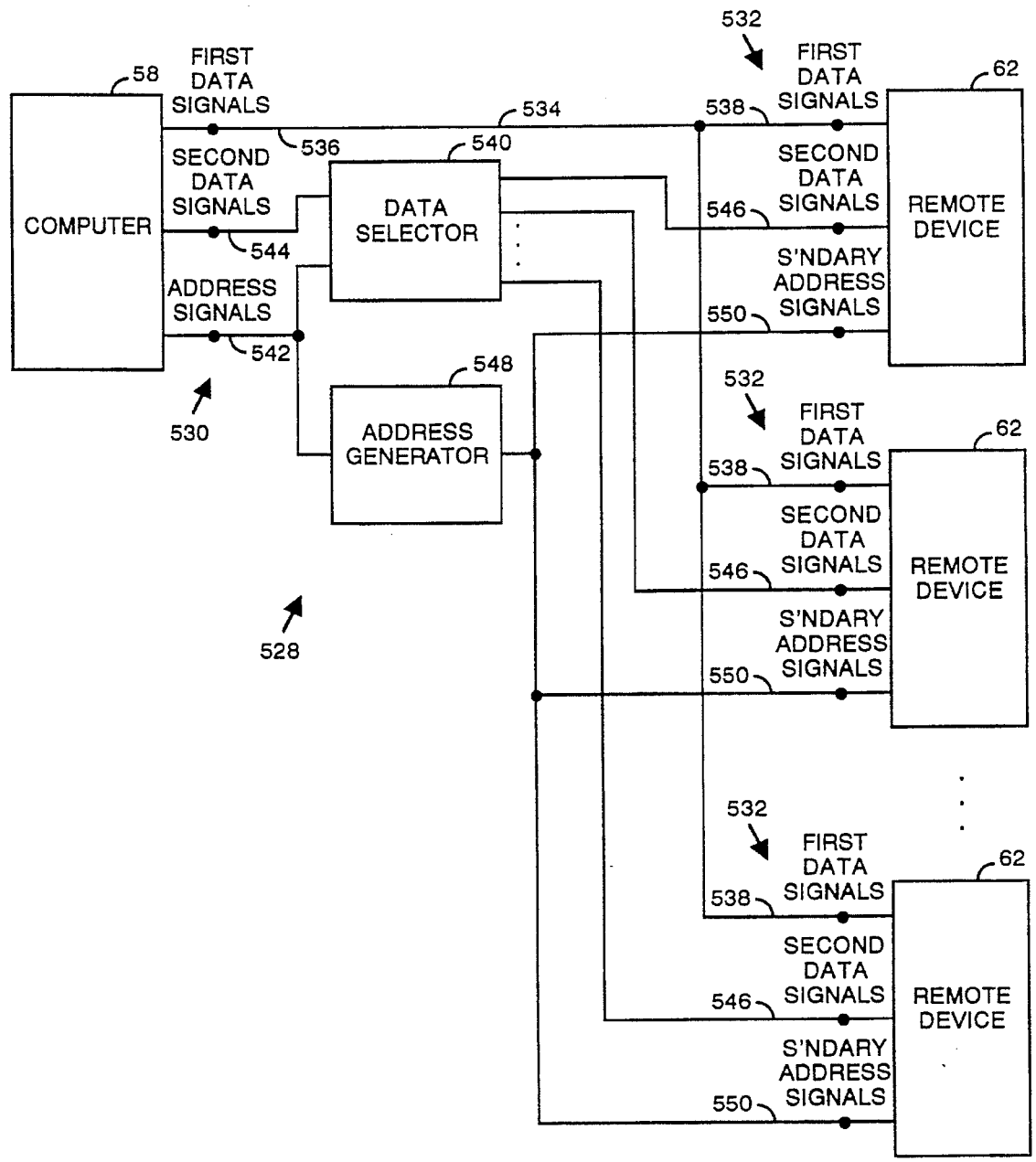
FIG. 11 shows a block diagram of an alternative embodiment of the present invention.

A block diagram of an alternative embodiment of an addressable computer interface 528 is shown in FIG. 11. The alternative embodiment provides a first data communication path between an input port 530 and each of a plurality of output ports 532, and provides a second data communication path between the input port 530 and a selected one of the plurality of output ports 532. A fixed coupling 534 between a representative first data signal line 536 of the input port 530 and a representative first data signal line 538 of each of the plurality of output ports 532 provides the first data communication path. A data selector circuit 540 receives an address signal along a representative address signal line 542 of the input port 530 to identify the selected one of the plurality of output ports 532 to which the second data communication path is to be provided. The data selector circuit 540 responds by providing the second data communication path between a representative second data signal line 544 of the input port 530 and a representative second data signal line 546 of the selected one of the output ports. An address generator 548 provides a secondary address signal along a representative secondary address line 550 to each of the plurality of output ports capable of driving a like cascadable computer interface. The secondary address signal is derived from a previous address signal received at the input port 530.

The use of the expression "representative line" in describing means for transferring signals is not to be construed as limiting with regard to the mode of signal transfer nor the number of interconnections provided by the line. For example, a generic representative line can represent one or more wires for providing signal transfer.

The alternative embodiment differs from aforementioned embodiments in that the first data communication path is continually provided between the input port and each of the output ports, in addition to the selectable second data communication path. In a similar manner as with the aforementioned embodiments, the transmission of the secondary address signal allows the addressable computer interface 528 to be cascadably interfaced to a like addressable computer interface, wherein the input port 530 of the like addressable computer interface is coupled to one of the output ports 532 of the interface 528.

Figure 12:
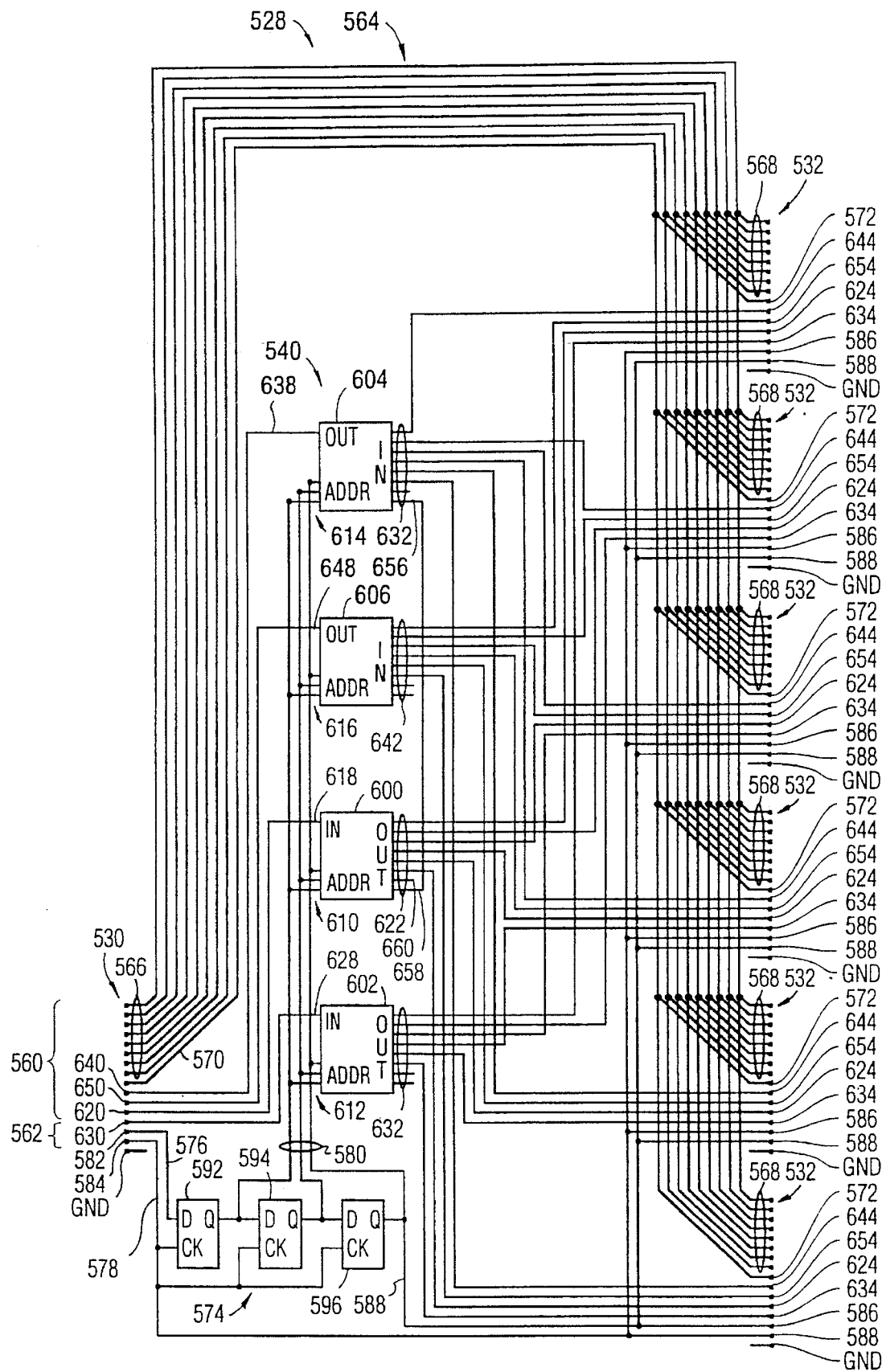
FIG. 12 shows a schematic drawing of an alternative embodiment of the present invention.

A specific alternative embodiment is illustrated by the schematic drawing in FIG. 12. The input port 530 and the output ports are parallel communications ports, each comprising a plurality of data lines 560 and a plurality of control lines 562. The distinction between data lines and control lines is made with respect to operation of the interface 528, and not with respect to a common application of parallel communications ports, namely, for control of a parallel printer. Specifically, data lines are used for communication via either the first or the second data communication path and control lines are employed for controlling the addressing of the interface 528. In general, the set of data lines and the set of control lines need not be mutually exclusive. For the sake of clarity, the coupling of the common ground lines of all ports is not shown in the schematic drawing of either FIG. 12 or FIG. 14.

A bus 564 provides a fixed, parallel coupling between eight parallel lines 566 of the input port 530 and eight parallel lines 568 of each of the output ports 532. The eight parallel lines enable eight parallel bits of data to be sent and received at a time via the interface 528. The bus 564 further provides a coupling between a strobe line 570 of the input port 530 and a strobe line 572 of each of the output ports 532. The strobe line is typically employed for signaling when the eight parallel lines of a parallel port are set and valid for reading by the remote device.

The address generator 548 is formed by a shift register 574 having a data input 576, a clock input 578, and a plurality of outputs 580. The data input 576 is coupled to a first control line 582 and the clock input is coupled to a second control line 584 of the input port. In response to a clock pulse received at the input port 530 along the second control line 584, the shift register 574 shifts the values of the plurality of outputs 580 by one output position, and inserts a bit derived from a signal present at the first control line 582 into a resulting open output position. To make the interface 528 cascadable by providing secondary address signals, a first control line 586 of each of the output ports 532 is coupled to a most significant bit output 588 of the shift register 574, and a second control line of each of the output ports 532 is coupled to the second control line 584 of the input port 530. As with the aforementioned embodiments, the shift register 574 is implemented by a cascaded connection of three flip-flops 592, 594, and 596.

The data selector 540 is provided by a first demultiplexer 600, a second demultiplexer 602, a first multiplexer 604, and a second multiplexer 606. Each of the first demultiplexer 600, the second demultiplexer 602, the first multiplexer 604, and the second multiplexer 606 includes a plurality of selection inputs 610, 612, 614, and 616, respectively, for coupling with the outputs 580 of the shift register 574. The first demultiplexer 600 further contains a demultiplexer input 618 coupled to a first selectable line 620 of the input port 530, and a plurality of demultiplexer outputs 622 coupled to a corresponding first selectable line 624 for each of the output ports 532. Similarly, the second demultiplexer 602 further contains a demultiplexer input 628 coupled to a second selectable line 630 of the input port 530, and a plurality of demultiplexer outputs 632 coupled to a corresponding second selectable line 634 for each of the output ports 532. Based upon the address signal received at the first and second control lines 582 and 584, the first and second demultiplexers 600 and 602 each provide a data transmission path from the input port 530 to the selected one of the output ports 532.

The first multiplexer 604 includes a multiplexer output 638 coupled to a third selectable line 640 of the input port 530, and a plurality of multiplexer inputs 642 coupled to a corresponding third selectable line 644 for each of the output ports 532. In a similar manner, the second multiplexer 606 further contains a multiplexer output 648 coupled to a fourth selectable line 650 of the input port 530 and a plurality of multiplexer inputs 652 coupled to a corresponding fourth selectable line 654 for each of the output ports 532. The first and second multiplexers 604 and 606 each provide a data transmission path from the selected one of the output ports 532 to the input port 530.

The interface 528 of FIG. 12 further includes presence detecting means as the embodiment of FIG. 4. A first means of detecting presence is produced by coupling a loopback input 656 of the first multiplexer 604 with a loopback output 658 of the first demultiplexer 600, wherein the loopback input 656 and loopback output 658 are enabled for the same selection inputs. A second means of detecting presence is produced by leaving input 660 of the first multiplexer 604 open. The same method of presence detection used in the embodiment of FIG. 4 is employed using the first selectable line 620 and the third selectable line 640 of the input port 530.

One with ordinary skill in the art will recognize that many alternative embodiments of the interface of FIG. 12 can be devised. For example, a different number of parallel lines can be included in the bus 564 for parallel ports which send and receive bytes comprising other than eight bits. Further, at least one of the parallel lines can be applied to the data selector circuit 540 rather than the bus 564 for the purpose of making the parallel lines selectable. Likewise, the strobe line can be applied to the data selector circuit 540 rather than the bus 564 to allow a selected remote device to signal the computer when the data lines are set and valid for reading in a bi-directional parallel port. Also, the number of demultiplexers and the number of multiplexers employed in the data selector circuit 540 are not limited to two; the data selector circuit 540 is said to generally contain at least one demultiplexer or at least one multiplexer.

The previously described versions of the present invention have many advantages. One such advantage is that the use of secondary addressing allows identical embodiments of the interface to be cascaded, thus providing any number of addressable multiplexed output ports necessary for the application of interest.

Another advantage is that remote peripheral devices need not have inherent addressing circuitry for use with embodiments of the invention. The remote peripheral devices are addressed by the use of secondary address signals which produce global shift registers formed by individual local shift registers in each interface unit.

A further advantage of an embodiment of the present invention is that it is inexpensive to manufacture. By employing a demultiplexer, a multiplexer, and either a shift register or discrete flip-flops, embodiments of the cascadable interface can be economically constructed using conventional integrated circuits.

While the best mode for carrying out the invention has been described in detail, those familiar with the art to which this invention relates will recognize various alternative designs and embodiments for practicing the invention defined by the following claims.

What is claimed is:

1. A cascadable computer interface apparatus for providing a data communication path between an input port and a selected one of a plurality of output ports, the apparatus comprising:

a data selector circuit, responsive to a received address signal indicating the selected one of the plurality of output ports, for providing the data communication path between an RS-232 serial communication input port and the selected one of the plurality of output ports;

a secondary signal generator, responsive to the received address signal, which provides a secondary address signal to each of a plurality of the output ports, including at least one non-selected output port, for addressing a like cascadable computer interface apparatus, wherein the secondary address signal is derived from a previously received address signal and wherein the received address signal and a secondary address signal are digital signals;

wherein the input port comprises a data transmit line, a data receive line, a first control line, and a second control line, wherein the received address signal is received via the first control line and the second control line.

2. The apparatus of claim 1 wherein the received address signal is received at the input port.

3. The apparatus of claim 1 wherein the data selector circuit comprises a multiplexer, responsive to the received address signal, for providing a first data transmission path from the selected one of the plurality of output ports to the input port.

4. The apparatus of claim 1 wherein the data selector circuit comprises a demultiplexer, responsive to the received address signal, for providing a second data transmission path from the input port to the selected one of the plurality of output ports.

5. The apparatus of claim 1 further comprising line receiver means for converting RS-232 logic signals at the input port to TTL logic signals.

6. The apparatus of claim 1 wherein each of the plurality of output ports is a RS-232 serial communications port.

7. The apparatus of claim 1 further comprising line driver means for converting TTL logic signals to RS-232 logic signals for application at each of the plurality of output ports.

8. The apparatus of claim 1 wherein the received address signal and the secondary address signal each comprise a first control signal and a second control signal.

9. A cascadable computer interface apparatus for providing a data communication path between an input port and a selected one of a plurality of output ports, the apparatus comprising:

a data selector circuit responsive to a data received address signal indicating the selected one of the plurality of output ports, for providing the data communication path between the input port and the selected one of the plurality of output ports;

a secondary signal, generator, responsive to the received address signal, which provides a secondary address signal to each of a plurality of the output ports, including at least one non-selected output port, for addressing a like cascadable computer interface apparatus, wherein the secondary address signal is derived from a previous received address signal; and presence detecting means, responsive to the received address signal and operative in response to receiving a predetermined address signal, for providing a presence signal to the input port.

10. The apparatus of claim 9 wherein the presence detecting means comprises:

data inhibit means for inhibiting transmission of data signals from each of the plurality of output ports to the input port.

11. The apparatus of claim 9 wherein the presence detecting means comprises:

first presence means for returning a data signal received at the input port back to the input port in response to receiving a first predetermined address signal.

12. The apparatus of claim 9 wherein the presence detecting means comprises:

second presence means for inhibiting transmission of a data signal received at the input port back to the input port in response to receiving a second predetermined address signal.

13. The apparatus of claim 1 wherein the secondary signal generator provides the secondary address signal to each of the plurality of output ports.

14. A cascadable computer interface apparatus for providing a data communication path between an input port and a selected one of a plurality of output ports, the apparatus comprising:

a data selector circuit, responsive to a received address signal indicating the selected one of the plurality of output ports, for providing the data communication path between the RS-232 serial communication input port and the selected one of the plurality of output ports;

a secondary signal generator, responsive to the received address signal, which provides a secondary address signal to each of a plurality of the output ports, including at least one non-selected output port, for addressing a like cascadable computer interface apparatus, wherein the secondary address signal is derived from a previously received address signal and wherein the received address signal and a secondary address signal are digital signals;

wherein each of the plurality of output ports comprises a data transmit line, an RS-232 serial communication port having a data receive line, a first control line, and a second control line, wherein the received address signal is received via the first control line and the second control line.

15. A cascadable computer interface apparatus for providing a data communication path between an input port and a selected one of a plurality of output ports, the apparatus comprising:

a data selector circuit, responsive to a received address signal indicating the selected one of the plurality of output ports, for providing the data communication path between the input port and the selected one of the plurality of output ports; and a secondary signal generator, responsive to the received address signal, which provides a secondary address signal to each of a plurality of the output ports, including at least one non-selected output port, for addressing a like cascadable computer interface apparatus, wherein the secondary address signal is derived from a previous received address signal and wherein the received address signal and a secondary address signal are digital signals;

wherein the received signal and the secondary signal each comprise a first control signal and a second control signal; and the data selector circuit comprises a shift register having a data input, a clock input, and a plurality of outputs wherein the data input is responsive to the first control signal, the clock input is responsive to the second control signal, and the plurality of outputs identifies the selected one of the plurality of output ports.

16. A computer interface apparatus for providing a data communication path between an input port and a selected one of a plurality of output ports, wherein the input port and each of the plurality of output ports is a RS-232 serial communications port having a data transmit line, a data receive line, a first control line, and a second control line, the apparatus comprising:

a shift register having a data input, a clock input, and a plurality of outputs, wherein the data input is responsive to a first control signal received from the first control line of the input port, and wherein the clock input is responsive to a second control signal received from the second control line, so that the plurality of outputs identifies the selected one of the plurality of output ports;

a multiplexer responsive to the plurality of outputs of the shift register, for providing a first data transmission path from the data transmit line of the selected one of the plurality of output ports to the data receive line of the input port; and a demultiplexer, responsive to the plurality of outputs of the shift register, for providing a second data transmission path from the data transmit line of the input port to the data receive line of the selected one of the plurality of output ports;

wherein the first control line of each of the plurality of output ports is coupled to a selected one of the plurality of outputs of the shift register, and the second control line of each of the plurality of output ports is coupled to the second control line of the input port.

17. A cascadable computer interface apparatus comprising:

a single serial input port having a data transmit line, a data receive line, a first control line, and a second control line;

a plurality of serial output ports each having a data transmit line, a data receive line, a first control line, and a second control line, wherein each of the serial output ports is mateable with a serial input port of a like cascadable computer interface apparatus; and a data selector providing a data communication path between the single serial input port and a selected one of the plurality of serial output ports in response to an address signal indicating the selected one of the plurality of serial output ports, the address signal received along the first control line and the second control line of the serial input port, wherein the data communication path includes a first data transmission path between the data transmit line of the selected one of the serial output ports to the data receive line of the serial input port, and wherein the data communication path further includes a second data transmission path between the data transmit line of the serial input port and the data receive line of the selected one of the serial input ports;

wherein the data selector circuit includes a shift register having a data input coupled to the first control line of the serial input port, a clock input coupled to the second control line of the serial input port, and a plurality of outputs which identify the selected one of the serial output ports; and wherein the first control line of each of the serial output ports is coupled to a selected one of the outputs of the shift register, and the second control line of each of the serial output ports is coupled to the second control line of the serial input port to provide a secondary address signal to each like cascadable computer interface coupled to the serial output ports.

18. The apparatus of claim 17 wherein the data selector comprises a multiplexer, responsive to the outputs of the shift register, for providing the first data transmission path from the data transmit line of the selected one of the plurality of serial output ports to the data receive line of the serial input port.

19. The apparatus of claim 17 wherein the data selector comprises a demultiplexer, responsive to the outputs of the shift register, for providing the second data transmission path from the data transmit line of the serial input port to the data receive line of the selected one of the plurality of serial output ports.

20. The apparatus of claim 17 wherein the serial input port is a RS-232 serial port.

21. The apparatus of claim 20 further comprising line receiver means for converting RS-232 logic signals at the serial input port to TTL logic signals.

22. The apparatus of claim 17 wherein each of the plurality of serial output ports is a RS-232 serial port.

23. The apparatus of claim 22 further comprising line driver means for converting TTL logic signals to RS-232 logic signals for application at each of the plurality of serial output ports.

24. The apparatus of claim 17 wherein the received signal is a digital signal.

25. The apparatus of claim 17 further comprising presence detecting means, responsive to the address signal and operative in response to receiving a predetermined address signal, for providing a presence signal to the data receive line of the serial input port.

26. The apparatus of claim 25 wherein the presence detecting means comprises:

data inhibit means for inhibiting transmission of data signals from the data transmit line of each of the plurality of serial output ports to the data receive line of the serial input port in response to receiving the predetermined address signal.

27. The apparatus of claim 25 wherein the presence detecting means comprises:

first presence means for returning a data signal received at the data transmit line of the serial input port back to the data receive line of the serial input port in response to receiving a first predetermined address signal.

28. The apparatus of claim 25 wherein the presence detecting means comprises:

second presence means for inhibiting transmission of a data signal received at the data transmit line of the serial input port back to the data receive line of the serial input port in response to receiving a second predetermined address signal.

* * * * *